(12) United States Patent
Werson

(10) Patent No.: US 6,497,201 B1
(45) Date of Patent: Dec. 24, 2002

(54) ASSEMBLY OF ROTATABLE MEMBERS

(75) Inventor: Michael John Werson, Eastleigh (GB)

(73) Assignee: Automotive Motion Technology, Ltd., Andover (GB)

( * ) Notice: Subject to any disclaimer, the term of this patent is extended or adjusted under 35 U.S.C. 154(b) by 0 days.

(21) Appl. No.: 09/807,490

(22) PCT Filed: Aug. 8, 2000

(86) PCT No.: PCT/GB00/03051

§ 371 (c)(1),
(2), (4) Date: Jul. 18, 2001

(87) PCT Pub. No.: WO01/13497

PCT Pub. Date: Feb. 22, 2001

(30) Foreign Application Priority Data

Aug. 13, 1999 (GB) .............................. 9919018

(51) Int. Cl.$^7$ .............................. H02K 16/00
(52) U.S. Cl. .................................. 123/41.12
(58) Field of Search ........................ 123/41.12, 41.46, 123/41.49, 41.55, 41.65, 198 C; 318/471, 67, 66; 310/114, 126

(56) References Cited

U.S. PATENT DOCUMENTS 6,213,061 B1 * 4/2001 Bartolazzi et al ........ 123/41.12

FOREIGN PATENT DOCUMENTS

| DE | 1563255 | 4/1970 |
|----|---------|--------|
| GB | 369869 | 9/1964 |
| GB | 1198526 | 7/1970 |
| GB | 2255859 | 11/1992 |
| JP | 59 175368 | 10/1984 |
| JP | 60 245456 | 12/1985 |
| JP | 09 275673 | 10/1997 |
| WO | WO 99/39426 | 8/1999 |

OTHER PUBLICATIONS

United Kingdom Patent Office Search Report (one page).
PCT International Search Report for PCT/GB00/03051, Oct. 31, 2000, 3 pages.

* cited by examiner

Primary Examiner—Gene Mancene
Assistant Examiner—Hyder Ali
(74) Attorney, Agent, or Firm—Dykema Gossett PLLC

(57) ABSTRACT

An assembly includes first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the first rotor being rotatable in response to electrical current flowing in the coils of the first stator and the second rotor being rotatable about the axis in response to electrical current flowing in the coils of the second stator.

17 Claims, 2 Drawing Sheets

ASSEMBLY OF ROTATABLE MEMBERS

This application claims priority to International Application No. PCT/GB00/03051 filed Aug. 8, 2000. The International Application was published in the English language on Feb. 22, 2001 as International Publication No. WO 01/13497 and itself claims the benefit of United Kingdom Application No. 9919018.3 filed Aug. 13, 1999.

DESCRIPTION OF INVENTION

This invention relates to an assembly of first and second rotatable members and more particularly but not exclusively to such an assembly which may be utilised for cooling e.g. an internal combustion engine.

Conventionally such engines are cooled with a coolant such as water, which is pumped through a water jacket and/or cooling fluid passages of the engine. The cooling fluid is cooled by being passed through a radiator, through which air may pass. The air may pass through the radiator due to movement of a vehicle driven by the engine, but usually a fan is provided to force air through the radiator, even when a vehicle is stationary.

It is known for the fan to be driven directly from the engine via a transmission such as a fan belt, but in modern high performance engines, more commonly, such cooling fans are electrically driven by an electric motor. The fan speed is usually constant when running, but the fan is switchable on and off under the control of a simple thermostat which senses cooling fluid temperature. Thus the fan is not switched on until required. However using a simple thermostat controlled fan, it is not possible to control the temperature of the engine with any accuracy, particular it is not possible to control the fan so that the engine temperature remains within a predetermined temperature range.

It is also known to drive an impeller of a coolant pump directly from the engine, but again in modern high performance vehicles, it is more usual for the coolant pump to be electrically driven. Usually the coolant pump is arranged to operate whenever the engine is operating, although may be controlled e.g. by a thermostat control or the like, if desired.

Thus typically the coolant pump and cooling fan are physically separate and are controlled separately via distinct controllers.

According to a first aspect of the invention we provide an assembly including first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the first rotor being rotatable in response to electrical current flowing in the coils of the first stator and the second rotor being rotatable about the axis in response to electrical current flowing in the coils of the second stator.

Thus utilising an assembly of the invention, particularly but not exclusively where the first rotatable member is an impeller of a coolant pump and the second rotatable member is a cooling fan, engine cooling for example may be achieved more efficiently as the assembly can be made more compact than in an arrangement having a physically separate coolant pump and cooling fan, and by virtue of the coils of the first and second stators being wound on a common core, the assembly is considerably economically advantageous.

Preferably the stator core is constructed so that the coils of the first stator are separated from the coils of the second stator so as to provide no or minimal magnetic interference. The core may also be optimally designed to provide separate magnetic circuits for the first and second stators.

Although many different stator winding configurations are possible, the stator core may include first radially extending formations about which coils of the first stator are wound, and second radially extending formations about which coils of the second stator are wound. The formations may be so called "teeth" which are affixed at one end to a generally circular stator core part, and are free at their opposite ends to have the coils wound thereon. The first radially extending formations may extend radially inwards from the circular stator core part, and the second radially extending formations may extend radially outwardly from the circular stator core part.

Thus the second radially extending formations may be positioned radially outwardly of the first radially extending formations.

Although many different core constructions are possible, preferably the core includes at least two core parts which are assembled upon relative axial movement, e.g. by axially extending fasteners connecting the two core parts together.

The stator core may be generally cylindrical having a generally central opening in which at least part of the first rotor is rotatably received, and the second rotor may include a rotor housing part which rotates externally of the stator core.

The second rotor may include a radially extending wall, and generally centrally of the radially extending wall the second rotor may have an axially extending part by which the second rotor is rotatable about the axis of rotation.

Thus the first rotor may include an axially extending hollow in which the axially extending part of the second rotor housing is received for rotation.

In this way the axial extent of the assembly may be minimised thus enabling a very compact design to be achieved.

Again various geometries are possible although preferably the first rotatable member is connected to the first rotor so as to rotate at a first axial end of the assembly and the second rotating member is connected to the second rotor so as to rotate at or towards a second axial end of the assembly. Thus the radially extending wall of the second rotor housing may be positioned in the second axial end of the assembly.

It will be appreciated that the first storage and first rotor are in effect two components of a motor, and the second stator and second rotor are two components of a second motor the stators sharing a common stator core. Both motors of the assembly are preferably brushless and the first rotor is rotated solely as a result of the flow of electrical current in the coils of the first stator and the second rotor is rotated solely as a result of the flow of electrical current in the coils of the second stator.

If desired a control means may be provided which is operative to control the supply of electrical current to the coils of the first and second stators.

Thus whereas with an arrangement which utilised a separate pump and cooling fan for example, separate controllers have been used but with the provision of the assembly of the invention, a single control means may be provided thereby simplifying construction.

In one embodiment the control means is adapted to supply electrical current in a predetermined sequence to sets of coils of the first stator whereby the first stator and first rotor of the assembly are a first switched reluctance motor. The control means may be adapted to supply electrical current in a predetermined sequence to sets of coils of the second stator too whereby the second stator and second rotor of the assembly are a second switched reluctance motor, and the control means may be adapted to control the supply of electrical current to the coils of the first and second stator independently.

The invention may be applied wherever it is required to provide two rotatable members in a compact assembly. However, the invention particularly lends itself to an arrangement in which the first rotatable member is an impeller of a fluid pump and the second rotatable member is a cooling fan, the cooling fan being operated to cool the fluid pumped by the pump. More especially the assembly may be adapted to be mounted so that the cooling fan directs cooling air through a radiator of a cooling system to cool cooling fluid pumped through the radiator by the pump.

To reduce the requirement for dynamic seals and the like to prevent pumped coolant leaking along the first rotor into the stator core, preferably the fluid which is pumped by the impeller is permitted to pass into a generally annular space exterior to the first rotor. Thus seals are only required to prevent the fluid leaking into the stator coils, but such seals may be static seals which are more easily and economically provided.

According to a second aspect of the invention we provide a system including an assembly according to the first aspect of the invention, the system further including a plurality of sensor means which provide inputs to the control means which responds by controlling the operation of the first and second rotatable members.

Thus utilising an assembly of the first aspect of the invention, a system which may be intelligently operated may be provided. For example, the control means may be adapted to control the speeds of rotation of each of the first and second rotatable members in dependence upon the inputs provided to the control means to optimise the performance of the system.

The system may be a cooling system, the assembly including an impeller to pump coolant, and a cooling fan in which case the speed of rotation of the impeller which pumps the fluid and the speed of rotation of the cooling fan may be controlled to maintain the temperature of the fluid in the system either below a maximum temperature or within a predetermined temperature range.

The invention will now be described with reference to the accompanying drawings in which.

Figure 1:
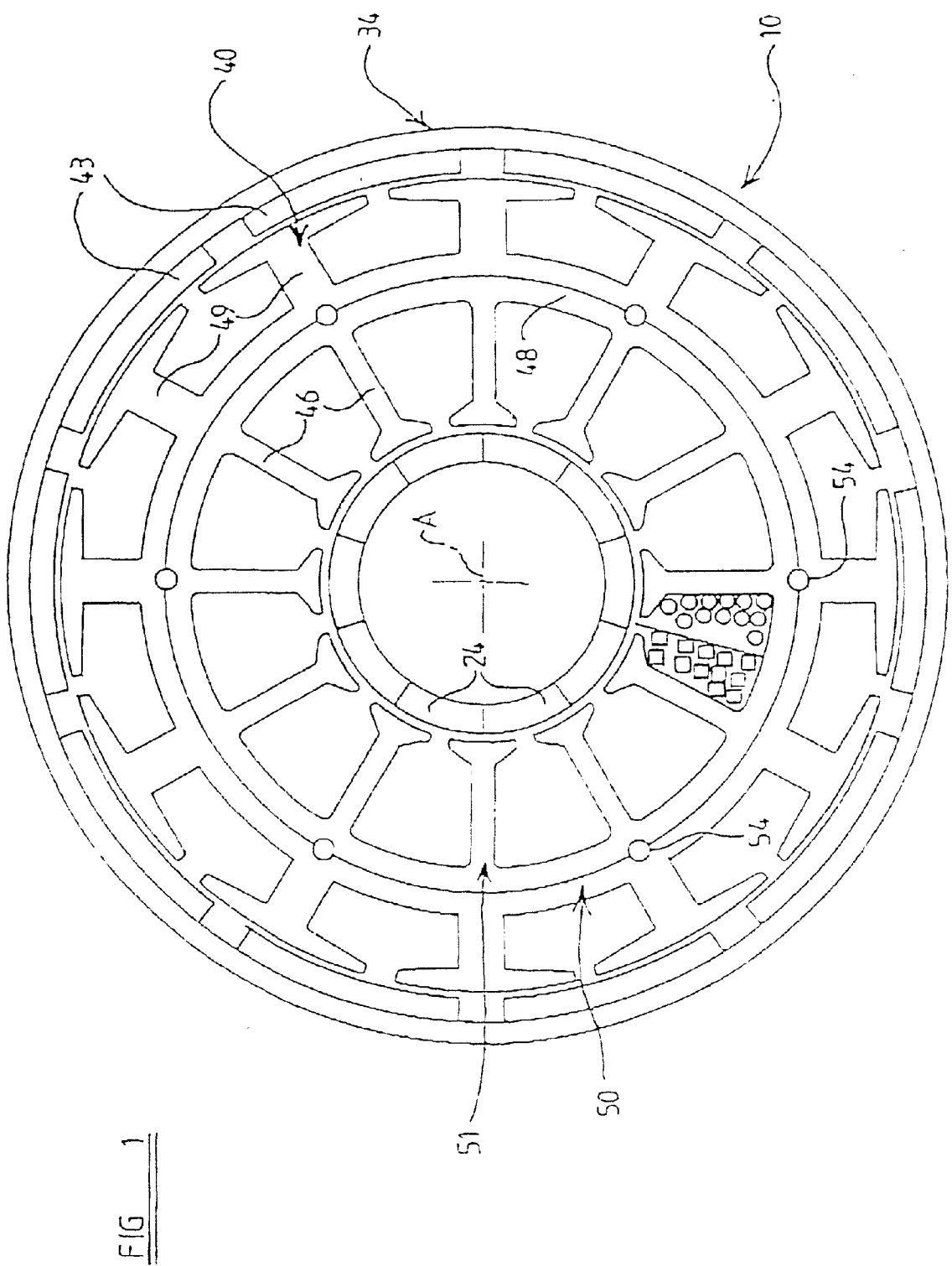
FIG. 1 is an illustrative end sectional view through an assembly in accordance with the invention.
Figure 2:
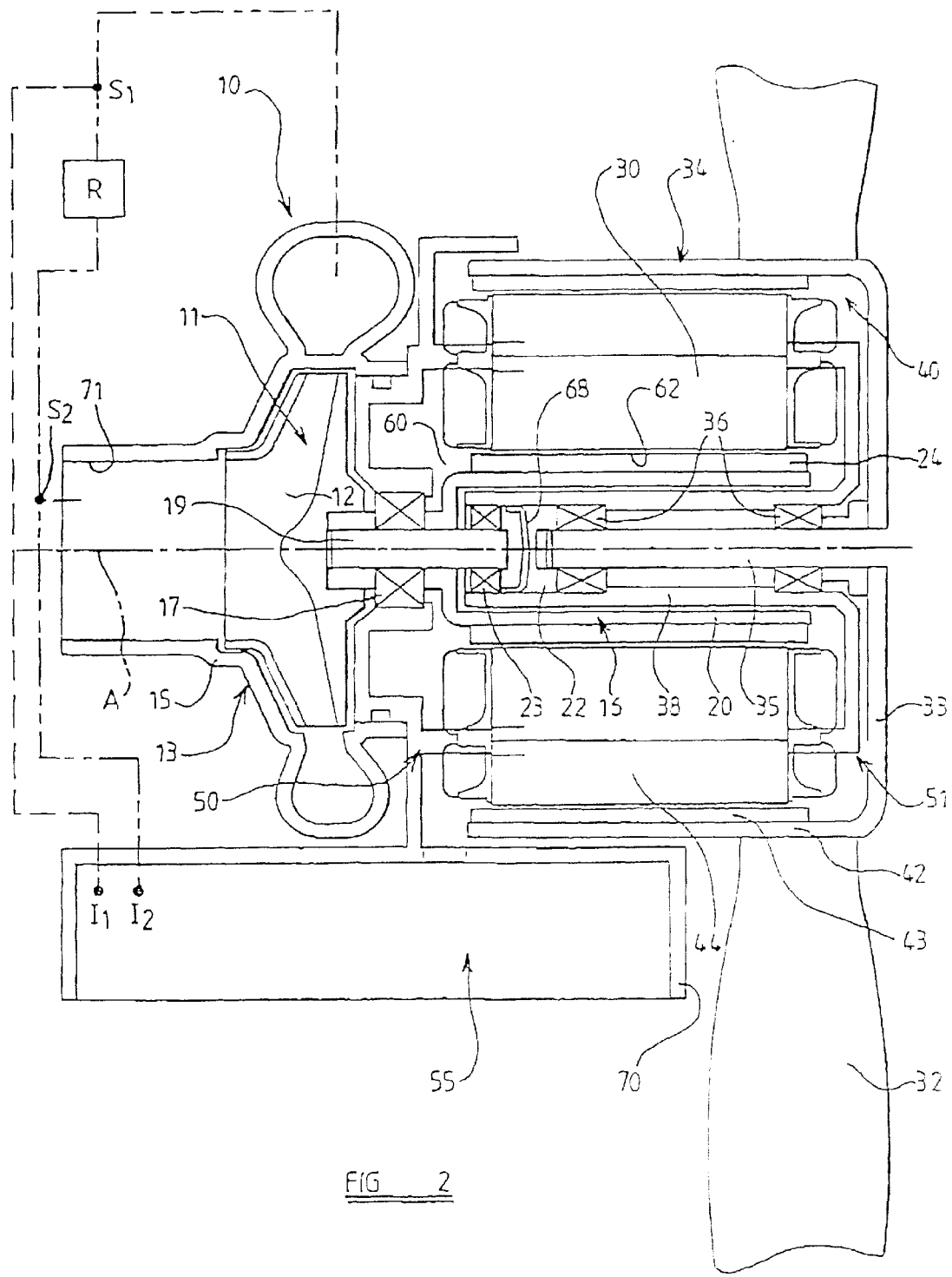
FIG. 2 is a side sectional illustrative view through an assembly in accordance with the invention, and showing schematically part of a system in which the assembly may be used.

Referring to the drawings an assembly 10 includes a first rotatable member 11 which in this example is an impeller 12 of a coolant pump 13, which impeller 12 is rotatable about an axis of rotation A in a pump housing 15. The first rotatable member 11 is connected to a first rotor 16, either by being attached by fastenings and/or co-operating formations, or by virtue of being integrally formed. The first rotor 16 is mounted in bearings 17 and has a first stub shaft 19 or similar part received in an outer rotor element 20, the bearings 17 bearing on the stub shaft 19.

The first stub shaft 19 extends into an internal hollow 22 of the outer rotor element 20 and is supported in the hollow 20 by further bearings 23 as hereinafter described.

The first rotor 16 includes, on the cylindrical exterior of the outer member 20, one or more magnets 24. By virtue of the magnet(s) 24, the first rotor 16 rotates in response to electrical current passing through coils of a first stator 30.

The assembly 10 includes a second rotatable member 32 which is in this example, a cooling fan. The fan 32 is rotatable about the axis A and is connected to a second rotor 34. The second rotor 34 is integral with a radially extending wall part 33, to which a second stub 35 is attached, the second stub shaft 35 extending axially inside the hollow 22 of the first rotor 16, and being arranged end to end with the first stub shaft 19 of the first rotor 16. The second stub shaft 35 mounts the second rotor 34 and the second stub shaft 35 is rotatable in bearings 36 which bear on the second stub shaft 35 and are positioned between the second stub shaft 35 and an inside surface of a cylindrical formation 38 of a stator core 40, on which surface the bearings 23 which support the axially inner end of the first stub shaft 19 of the first rotor 16, also bear.

The second rotor 34 includes a generally cylindrical surface 42, which on the interior thereof, carries one or usually a plurality of permanent magnets 43. The second rotor 34 rotates about axis A in response to electrical current passing through coils of a second stator 44, which is arranged concentrically with the first rotor 16. The cylindrical surface 42, and radially extending wall 33, together provide a second stator housing. The rotors 16, 34 may typically be made of steel.

It will be appreciated from FIG. 1 that the coils of both the first 30 and second 44 stators are wound on formations of a common stator core 40. The coils of the first stator 30 are wound on first "teeth" formations 46 which extend generally radially of the assembly 10 and are connected at one end to a cylindrical stator core part 48, whilst the opposite ends of the teeth formations 46 are free, albeit slightly enlarged, to enable the coils to be wound onto the teeth formations 46 and be retained thereon. The coils are not shown in FIG. 1, for clarity.

The coils of the second stator 44 are similarly wound, but on second teeth formations 49 which extend radially outwardly from the cylindrical stator core part 48. Again opposite free ends of the second teeth formations 49 are slightly enlarged to assist in retaining coils wound thereon. Again, the coils are not shown FIG. 1.

The stator core 40 has in this example, two parts 50, 51 which may be assembled the separated upon relative axial movement. Thus the cylindrical stator core part 48 includes a component of one of the core parts 50, and a component of the other of the core parts 51. The two core parts 50, 51 may be secured together by fasteners such as axially extending pins or bolts such as indicated at 54 in the drawings. Each stator core part 50, 51 may be made of ferromagnetic material and formed by a stack of laminations stacked along the axis A of the stator core 40, as is well known in the art.

In this example, the first rotor 16 and the first stator 30, and the second rotor 34 and second stator 44 operate as brushless D.C. switched reluctance motors. Thus sets of coils of the first stator 30 are excited by electrical current in a predetermined sequence, as are the coils of the second stator 44.

The motors are independently operable and controllable. To this end, the cylindrical stator core part 48 has sufficient bulk and magnetic flux carrying capacity, that the magnetic circuit which flows through the cylindrical stator core part 48 when the coils of the first stator 30 are excited remains substantially separate from the magnetic circuit which flows through the cylindrical stator core part 48 when the coils of the second stator 44 are excited.

To control the two motors, a control means 55 is provided. It will be appreciated that particularly but not exclusively because the coils of the first 30 and second 44 stators are wound on a common core 40, a single control means 55 may conveniently be provided with appropriate electrical connections to all of the coils e.g. to each of the sets of coils of the first 30 and second 44 stators and to rotor position sensors where these are provided, to sense the rotational positions of the rotors, and to synchronise respective winding energisation with the rotational position of the respective rotor.

It will be appreciated that the invention is concerned primarily with the construction of a compact assembly 10 having two rotatable members 12 and 32 and not with any specific motor operating mode. Reference is made to our previous granted UK Patent number 2297433 in which these is a description of a typical mode of operating a brushless D.C. motor, although the invention is applicable to other modes of operation of switched reluctance, other D.C. brushless or other motors as will be apparent to a person skilled in the art.

In the example of the present invention described with reference to the drawings, the first rotatable member 13 is a pump impeller 12. Conventionally, it is a requirement in electric pumps to provide a dynamic seal to prevent the leakage of the fluid being pumped along the mounting shaft is first stub shaft 19 into the coils of a motor driving the impeller. However such dynamic seals are prone to failure, and are difficult satisfactorily to achieve, as well as being costly.

In accordance with the invention, a specific dynamic seal is not provided. Rather, the fluid being pumped is permitted to pass between the first stub shaft 19 and the bearings 17 into an annular space 60 around the outside of the first rotor 16 such that the magnets 24 thereof are immersed in the fluid. The fluid is prevented from passing into contact with the coils of the first stator 30 by a barrier 62 (not seen in FIG. 1) being a cylindrical sleeve of the stator core 40 which provides a static seal.

The sleeve barrier 62 is sealed at its ends relative to the first and second stator core parts 50, 51 so that the fluid is contained and cannot pass the ends of the cylindrical sleeve 62.

Any fluid which leaks from the pump 13 along the stub shaft 19 of the first rotor 16 into the hollow 22 of the first rotor 16 is retained by a further static seal 68 between the first and second stub shafts 19 and 35, which seal 68 closes the hollow 22.

In one application, the assembly 10 is part of a cooling system for an internal combustion engine, the pump 13 pumping coolant around the engine to cool the engine. The cooling fan 32 fans air through a radiator R through which the coolant is passed to cool the coolant.

By virtue of the compact design of the assembly 10 achieved by the first and second rotors 16, 34 being arranged concentrically and the coils of the first 30 and second 44 stators being wound on a common stator core 40, the assembly may conveniently be mounted for example, in an opening in the radiator R. The control means 55 is preferably located adjacent to the assembly 10 as shown, for example in a housing part 70 which may integrally be formed with the stator core 40 or at least with one of the parts 50, 51 (part 50 in this example) of the stator core 40.

In such an application, modification to the assembly 10 design may be required to suit particular engine etc. layouts. For example, as shown a fluid inlet 71 to the impeller 12 is arranged axially of the assembly 10, but in another example may extend transverse thereto, i.e. the fluid inlet may include an elbow fitting or the like.

The overall diameter of the assembly 10 need not be shown, but may be adapted to suit a different dimension space in which the assembly 10 is to be located.

The number of poles (teeth formations 46, 49) of the first and second stators 30, 44 for the coils of the stators 30, 44 may be different for different motor designs and a different number of teeth 46 of the first stator 30 may be provided from the number of teeth 49 of the second stator 44. The teeth formations 46, 49 need not extend radially as in the example described.

The control means 55 may control the rotation of the first and second rotatable members 12, 32 substantially independently. Although the rotatable members 12, 32 most practically will be rotated in a common direction of rotation, these could be rotated in opposite direction if this is desired.

If desired, the speed (and direction) of rotation of each of the rotatable members 12, 32 may be controlled in response to inputs (11, 12) to the control means 55. For example where the assembly 10 is applied to a cooling system for an engine, such inputs may include measurements of temperature e.g. of coolant entering and leaving the radiator R from respective sensors S1, S2, so that the speed of the pump 13 and of the cooling fan 32 may be altered to increase or decrease the cooling effect of the assembly 10, so as to maintain the temperature of the coolant either below a maximum temperature, or preferably within a predetermined temperature range, so that the cooling system may intelligently respond to changing engine operating conditions.

During engine start-up from cold say, the cooling system may thus be operated to enable the engine to reach an optimum working temperature in as short a time as possible, and maximum cooling effect may only be achieved when required leading to engine fuel economy.

Although the invention has particularly been described as applied to an assembly 10 for use in a cooling system of an engine, the invention may be applied in any other appropriate circumstances where a compact design of an assembly having two rotatable members which require individual control, are required.

What is claimed is:

1. An assembly including first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the coils of the first stator separated from the coils of the second stator so as to provide no or minimal magnetic interference, the first rotor being rotatable in response to electrical current flowing in the coils of the first stator and the second rotor being rotatable about the axis in response to electrical current flowing in the coils of the second stator wherein the stator core includes first radially extending formations about which coils of the first stator are wound, and second radially extending formations about which coils of the second stator are wound.

2. The assembly of claim 1 wherein the first radially extending formations extend radially inwardly and the second radially extending formations extend radially outwardly.

3. The assembly of claim 2 wherein the first and second radially extending formations are aligned.

4. An assembly according to claim 3 wherein the second radially extending formations are positioned radially outwardly of the first radially extending formations.

5. An assembly including first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the first rotor being rotatable in response to electrical current flowing in the coils of the first stator and the second rotor being rotatable about the axis in response to electrical current flowing in the coils of the second stator wherein the core includes at least two core parts which are assembled upon relative axial movement.

6. An assembly according to claim 5 wherein the first rotatable member is connected to the first rotor so as to rotate at a first axial end of the assembly and the second rotating member is connected to the second rotor so as to rotate at or towards a second axial end of the assembly.

7. An assembly according to claim 6 wherein the second rotor includes a radially extending wall and the radially extending wall of the second rotor is positioned at the second axial end of the assembly.

8. An assembly according to claim 5 wherein the assembly is brushless and the first rotor is rotated solely as a result of the flow of electrical current in the coils of the first stator and the second rotor is rotated solely as a result of the flow of electrical current in the coils of the second stator.

9. An assembly according to claim 8 wherein a control means is provided which is operative to control the supply of electrical current to the coils of the first and second stators.

10. An assembly according to claim 9 wherein the control means is adapted to supply electrical current in a predetermined sequence to sets of coils of the first stator whereby the first stator and first rotor of the assembly are a first switched reluctance motor.

11. An assembly according to claim 9 wherein the control means is adapted to supply electrical current in a predetermined sequence to sets of coils of the second stator whereby the second stator and second rotor of the assembly are a second switched reluctance motor.

12. An assembly according to claim 9 wherein the control means is adapted to control the supply of electrical current to the coils of the first and second stators independently.

13. An assembly including first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the stator core being generally cylindrical and having a generally central opening in which at least a part of the first rotor is rotatably received, the second rotor including a rotor housing part which rotates externally of the stator core, the first rotor being rotatable in response to electrical current flowing in the coils of the first stator and the second rotor being rotatable about the axis in response to electrical current flowing in the coils of the second stator, the second rotor including a radially extending wall, and generally centrally of the radially extending wall the second rotor has an axially extending part by which the second rotor is rotatable about the axis of rotation wherein the first rotor includes an axially extending hollow in which the axially extending part of the second rotor is received for rotation.

14. An assembly including first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the first rotor being rotatable in response to electrical current flowing in the coils of the first stator and the second rotor being rotatable about the axis in response to electrical current flowing in the coils of the second stator wherein the first rotatable member is an impeller of a fluid pump and the second rotatable member is a cooling fan, the cooling fan being operated to cool the fluid pumped by the pump and the assembly is adapted to be mounted so that the cooling fan directs cooling air through a radiator of a cooling system to cool cooling fluid pumped through the radiator by the pump, the fluid which is pumped by the impeller being permitted to pass into a generally annular space exterior of the first rotor.

15. A system including an assembly including first and second rotatable members which rotate about a common axis of rotation, the first member being connected to a first rotor and the second member being connected to a second rotor, the first and second rotors being concentrically arranged, the assembly further including a first stator including coils wound about a core, and a second stator including coils also wound about the core, the core including at least two core parts which are assembled upon relative axial movement, the first rotor being rotatable in response to electrical current flowing in the coils of the first stator and the second rotor being rotatable about the axis in response to electrical current flowing in the coils of the second stator the assembly including a control means which is operative to control the supply of electrical current to the coils of the first and second stators, the system further including a plurality of sensor means which provide inputs to the control means which responds by controlling the operation of the first and second rotatable members.

16. A system according to claim 15 wherein the control means is adapted to control the speeds of rotation of each of the first and second rotatable members in dependence upon the inputs provided to the control means to optimize the performance of the system.

17. A system according to claim 16 wherein the system is a cooling system and the first rotatable member is an impeller of a fluid pump and the second rotatable member is a cooling fan, the cooling fan being operative to cool the fluid pumped by the pump, and the speed of rotation of the impeller which pumps the fluid and the speed of rotation of the cooling fan are controlled to maintain the temperature of the fluid in the system either below a maximum temperature or within a predetermined temperature range.

* * * * *

UNITED STATES PATENT AND TRADEMARK OFFICE
CERTIFICATE OF CORRECTION

PATENT NO.      : 6,497,201 B1                                                  Page 1 of 1
DATED           : December 24, 2002
INVENTOR(S)     : Werson, John Michael It is certified that error appears in the above-identified patent and that said Letters Patent is hereby corrected as shown below:

<u>Column 7,</u>
Line 1, delete "3" and substitute -- 1 -- therefor.

Signed and Sealed this

Thirteenth Day of May, 2003

JAMES E. ROGAN
*Director of the United States Patent and Trademark Office*